United States Patent
Giacobbe

(10) Patent No.: US 8,827,679 B2
(45) Date of Patent: Sep. 9, 2014

(54) LOW POWER CONSUMPTION MACHINE FOR BLOW-MOULDING CONTAINERS

(75) Inventor: Ferruccio Giacobbe, Carate Biranza (IT)

(73) Assignee: MAGIC MP S.p.A., Carate Brianza (IT)

( * ) Notice: Subject to any disclaimer, the term of this patent is extended or adjusted under 35 U.S.C. 154(b) by 0 days.

(21) Appl. No.: 13/881,235

(22) PCT Filed: Oct. 25, 2011

(86) PCT No.: PCT/IB2011/002537
§ 371 (c)(1),
(2), (4) Date: Apr. 24, 2013

(87) PCT Pub. No.: WO2012/056293
PCT Pub. Date: May 3, 2012

(65) Prior Publication Data
US 2013/0209597 A1 Aug. 15, 2013

(30) Foreign Application Priority Data
Oct. 26, 2010 (IT) .............................. MI2010A1977

(51) Int. Cl.
| | | |
|---|---|---|
| *B29C 49/56* | (2006.01) | |
| *F42C 19/08* | (2006.01) | |
| *F42B 5/34* | (2006.01) | |
| *B29D 22/00* | (2006.01) | |
| *F42B 1/024* | (2006.01) | |
| *B29C 49/78* | (2006.01) | |
| *F42C 19/10* | (2006.01) | |
| *F42B 5/36* | (2006.01) | |
| *B29C 49/04* | (2006.01) | |
| *B29C 49/42* | (2006.01) | |
| *B29C 49/58* | (2006.01) | |
| *B29C 49/32* | (2006.01) | |

(52) U.S. Cl.
CPC ............... *B29D 22/003* (2013.01); *B29C 49/04* (2013.01); *B29C 49/4284* (2013.01); *F42C 19/0823* (2013.01); *F42C 19/083* (2013.01); *F42B 5/34* (2013.01); *F42B 1/024* (2013.01); *B29C 49/78* (2013.01); *B29C 2049/5875* (2013.01); *F42C 19/10* (2013.01); *F42C 19/08* (2013.01); *B29C 49/32* (2013.01); *B29C 49/4236* (2013.01); *F42B 5/36* (2013.01)
USPC ............ 425/162; 425/532; 425/541; 700/200

(58) Field of Classification Search
CPC ........... B29C 2949/78756; B29C 2949/78563; B29C 2949/78445
USPC .......................... 425/532, 541, 162; 700/200
See application file for complete search history.

(56) References Cited

U.S. PATENT DOCUMENTS

| | | | |
|---|---|---|---|
| 2002/0139593 A1* | 10/2002 | Charaudeau et al. | 180/65.3 |
| 2010/0094494 A1* | 4/2010 | Jerwick | 701/22 |
| 2013/0119665 A1* | 5/2013 | Berbari | 290/50 |

*Primary Examiner* — Joseph S Del Sole
*Assistant Examiner* — Nahida Sultana
(74) *Attorney, Agent, or Firm* — Mintz Levin Cohn Ferris Glovsky and Popeo, P.C.

(57) ABSTRACT

Machine for forming containers (3a), comprising a unit (2) for extruding tubes (3) made of plastic, associated with an electric extrusion motor (200), a blowing unit (5) associated with an electric blowing motor (500), a mould (4) for containing the containers (3a), formed by two half-moulds (4a, 4b) movable, upon operation of an associated electric mould motor (400), in a longitudinal direction X-X, the unit formed by the mould (4) and by the associated mould operating motor (400) being displaceable, upon operation of an electric displacement motor (300), in a transverse direction (Y-Y) from a first position substantially aligned with the extrusion unit (2) into a second position substantially aligned with the blowing unit (5) and vice versa, comprising at least one base power supply/recovery module (2000) and at least one first control module (2300) connected to said displacement motor (400) for controlling the acceleration/deceleration thereof.

11 Claims, 3 Drawing Sheets

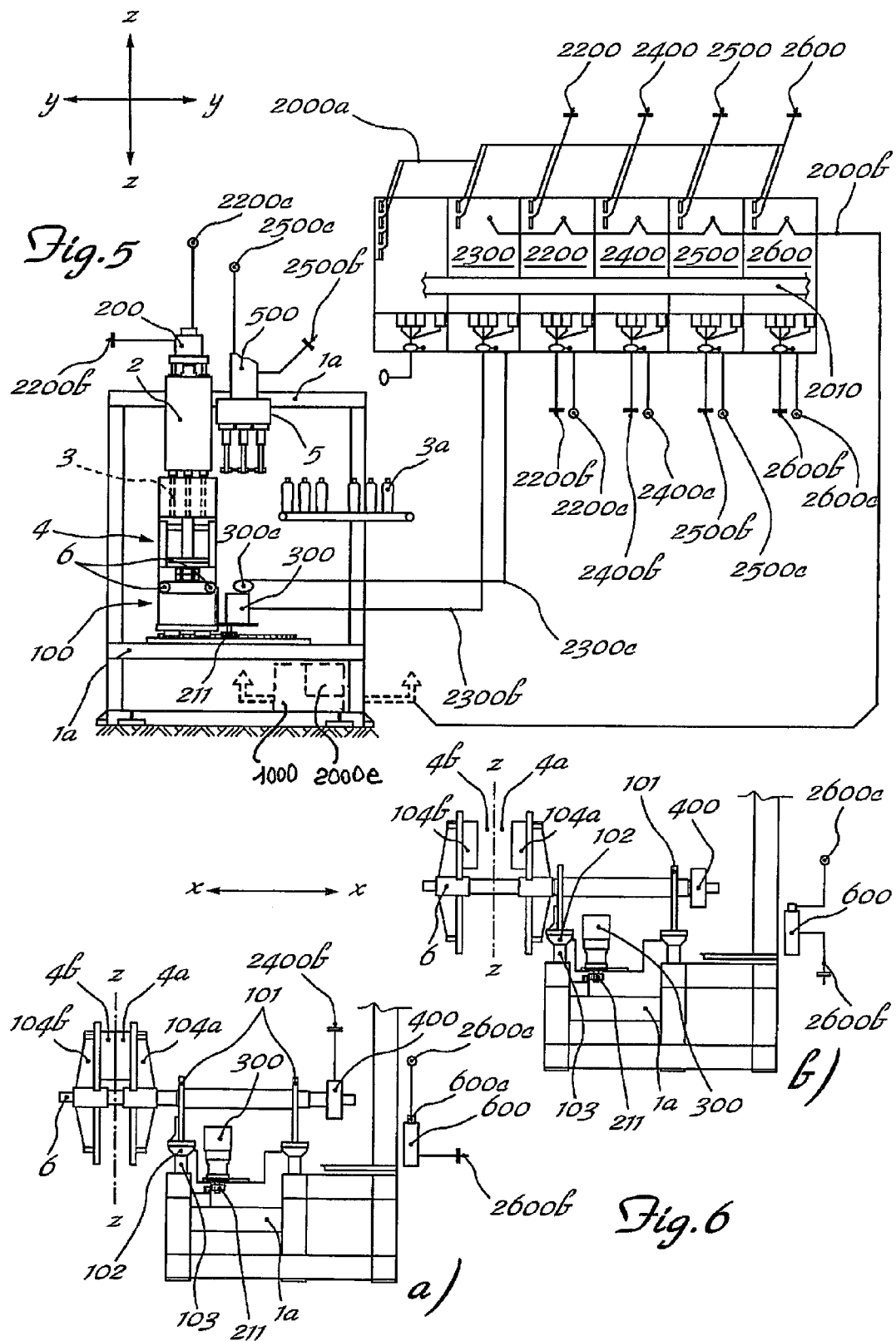

US 8,827,679 B2

LOW POWER CONSUMPTION MACHINE FOR BLOW-MOULDING CONTAINERS

RELATED APPLICATIONS

This application is a national phase entry of PCT application No. PCT/IB2011/002537 filed on Oct. 25, 2011, which claims priority to Italian patent application No. MI2010A001977, filed on Oct. 26, 2010, the contents of each are hereby incorporated by reference.

FIELD

The present invention relates to a low power consumption machine for blow-moulding plastic containers.

BACKGROUND

It is known in the technical sector relating to the packaging of liquid products and the like that there exists the need to manufacture plastic containers suitable for use with the product which they must contain.

It is also known that said containers are formed in suitable blow-moulding machines provided with associated moulds (composed of two half-moulds movable into open/closed positions) inside which a plastic tube (parison) extruded upstream of the mould is introduced and blow-moulded and that said machines are substantially formed by a plastic tube extrusion unit, a blowing unit, a container holding mould formed by two half-moulds movable, upon operation of associated first means, in a longitudinal direction symmetrically with respect to a fixed axis perpendicular to said longitudinal direction and that the entire unit, formed by the mould and by the associated first operating means, is movable, upon operation of associated second operating means, in a transverse direction, from a first position, corresponding to positioning of the mould below the extrusion unit, into a second position corresponding to positioning of the mould below the blowing unit.

It is also known that, in order to reduce the contamination resulting from the movements performed by oil-hydraulic means and improve the precision and stability of the associated closing movement of the half-moulds, operating systems which use electric motors have been introduced; these systems, although suitable for machines with relatively small dimensions (and therefore with a low mould closing force), are unsuitable for the movement of displacement units in larger size machines where the high masses which must be displaced with very fast accelerating and decelerating movements—needed in order to keep the displacement idle time within the limits permitted by the machine cycle for forming a part—result in a high power consumption which greatly increases the final costs for production of the containers.

Such a machine is for example known from EP 1,591,226 in the name of the same present Applicant.

U.S. Pat. No. 6,526,800 and FR 2,902,366 also disclose known devices generally used in association with machine tools and able to perform recovery of the energy resulting from deceleration of electrically operated moving parts.

Although fulfilling their function, these devices nevertheless have the drawback arising from the fact that also a part of the energy recovered is dissipated owing to the limited efficiency of the recovery apparatus and the poor synchronization of the energy recovery/supply between the operating systems for the various moving parts.

SUMMARY

The technical problem which is posed therefore is that of providing a machine for blow-moulding plastic containers from extruded tubes, which is able to allow easy and rapid adaptation thereof to large dimensions, but at the same time is able to avoid the high energy consumption associated with the greater masses which must be moved in said machines.

These results are achieved according to the present invention by a machine for forming containers according to the characteristic features of claim 1.

In one aspect, a machine for forming containers (3a), comprises a unit (2) for extruding tubes (3) made of plastic, associated with an electric extrusion motor (200), a blowing unit (5) associated with an electric blowing motor (500), a mould (4) for containing the containers (3a), formed by two half-moulds (4a,4b) movable, upon operation of an associated electric mould motor (400), in a longitudinal direction X-X, the unit formed by the mould (4) and by the associated mould operating motor (400) being displaceable, upon operation of an electric displacement motor (300), in a transverse direction (Y-Y) from a first position substantially aligned with the extrusion unit (2) into a second position substantially aligned with the blowing unit (5) and vice versa, comprising an apparatus comprising at least one base power supply/recovery module (2000) and at least one first control module (2300) connected to said displacement motor (400) for controlling the acceleration/deceleration thereof during the displacement stroke and the recovery of energy during deceleration of each stroke.

Further details may be obtained from the following description of a non-limiting example of embodiment of the subject of the present invention provided with reference to the accompanying drawings.

DESCRIPTION OF DRAWINGS

FIG. 5: shows a view similar to that of FIG. 1 of the machine according to the invention with energy recovery apparatus connected to all the motors of the machine; and FIGS. 6a, 6b: is a partially sectioned side view of the structure of the mould in the closed condition and open condition, respectively.

DESCRIPTION

Figure 1:
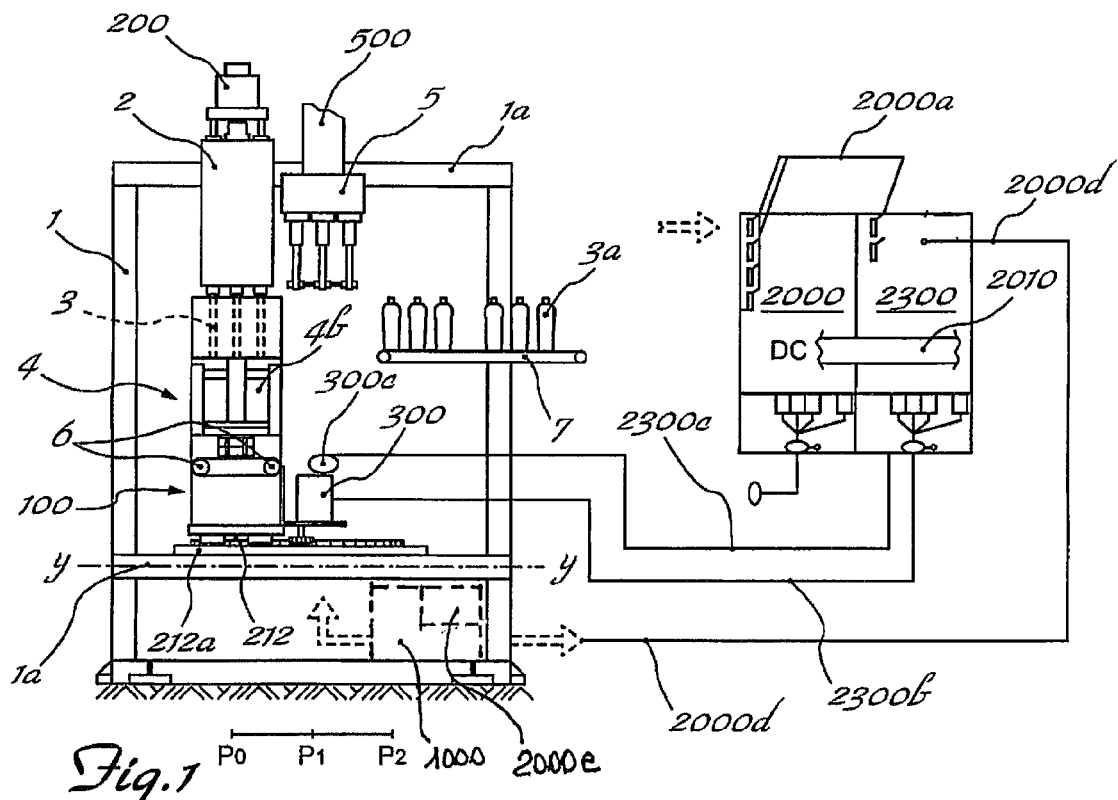
FIG. 1: shows a schematic front view of the machine according to the invention during removal of the extruded tubes.
Figure 2:
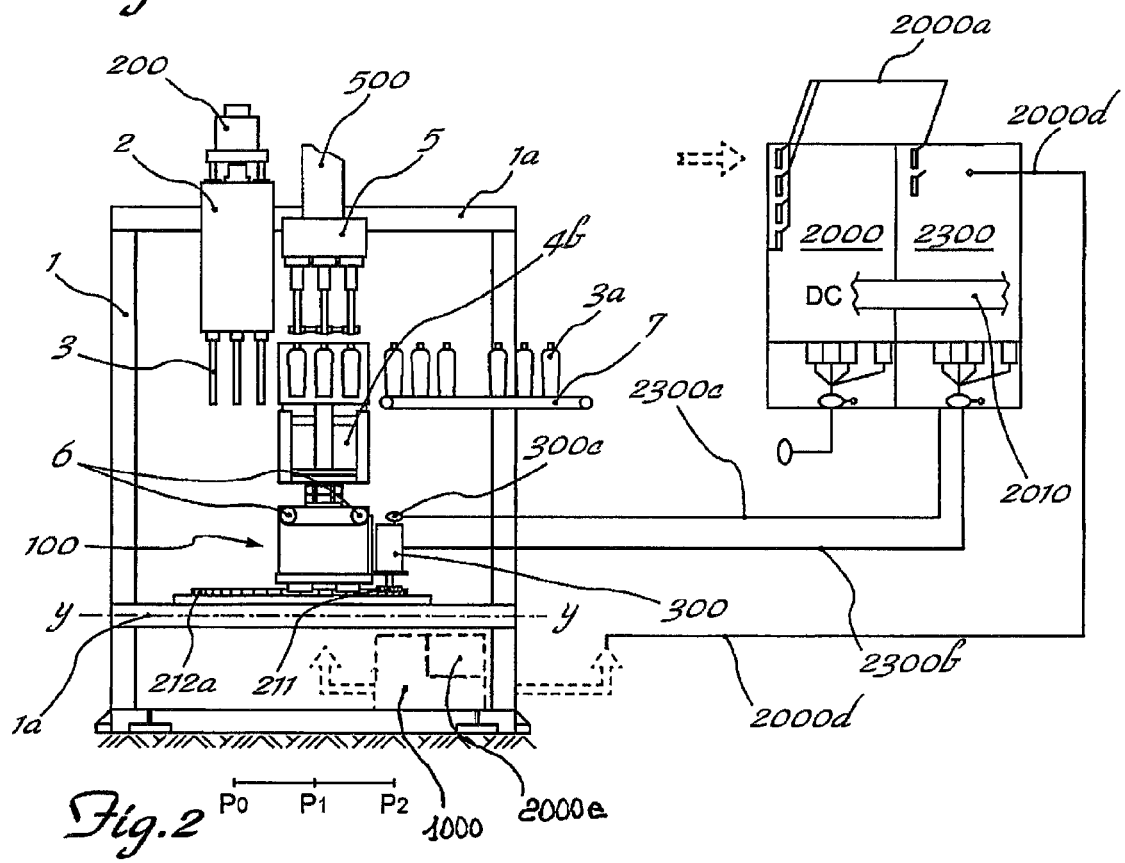
FIG. 2: shows a schematic front view of the machine according to the invention during moulding.

As shown and assuming solely for the sake of convenience of the description and without any limitation a set of three reference axes in a longitudinal direction X-X coinciding with the mould opening/closing direction, transverse direction Y-Y coinciding with the mould displacement direction, and vertical direction Z-Z, the machine according to the present invention has a support frame comprising uprights 1 and cross-members 1a to which the following are fastened:

- the means 2 for extruding the plastic tube 3 with an associated first motor 200;
- a mould 4 with associated electric motor 400 (FIG. 6) for performing opening/closing in the longitudinal direction X-X;
- an electric motor 300 for moving the entire mould holder unit 4 in the transverse direction Y-Y;

blowing nozzles 5 with an associated blowing motor 500; a motor 600 for raising/lowering the extrusion die (not shown); and means 7 for evacuating the formed containers 3*a*.

Said mould 4 (FIG. 6) is formed by two half-moulds 4*a*,4*b* which are arranged symmetrically with respect to a fixed vertical reference axis of symmetry Z-Z and joined to respective flanges 104*a*,104*b* mounted on a pair of guides 6 with a circular cross-section connected to the structure 1 by means of the support flanges 101 in turn joined to guides 102 sliding on rails fixed to the frame 1, there being provided a synchronization mechanism (not shown) for performing the symmetrical movement of the second half-mould 4*b* relative to the first half-mould 4*a* and consequently symmetrical opening/closing of the mould 4 with respect to the fixed vertical reference axis Z-Z.

The motor 300 displacing the mould unit in the transverse direction Y-Y is connected to at least one reduction gear unit having a shaft carrying a pinion 211 able to engage with a linear rack 212 arranged parallel to the transverse axis Y-Y and fixed to one of the cross-members 1*a* of the structure 1 of the machine, if necessary with the aid of a support 212*a*.

It is also envisaged that all the operating steps of the various moving parts and the associated operating systems are controlled by programming devices 1000 of the electromechanical, electronic and/or processing program type.

Figure 3:
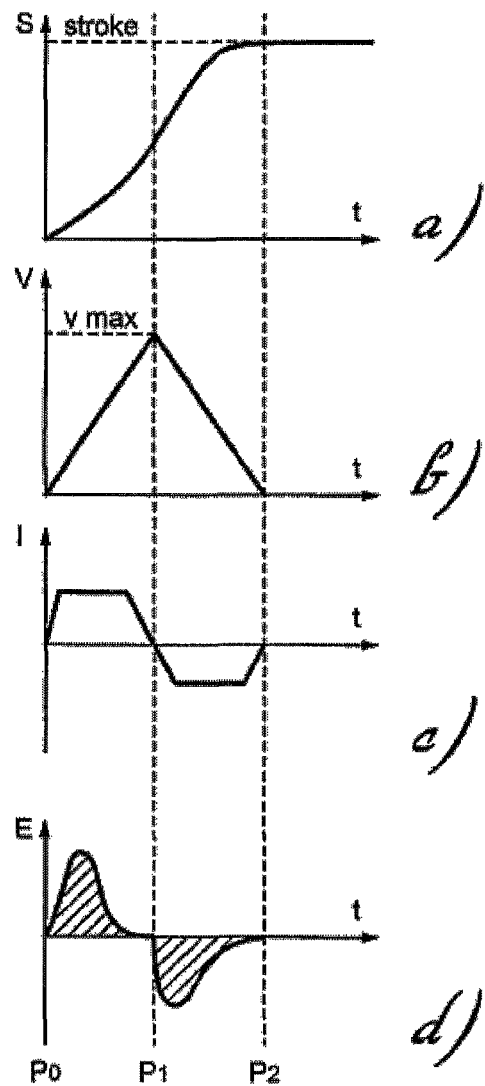
FIG. 3: shows graphs illustrating the trend of the control parameters of the electric motors during the outward displacement stroke.

With this configuration and as shown in FIGS. 1, 3 and 6, the operating sequences of the machine are performed as follows:

in a sequence which is coordinated and controlled by suitable programming and control means 1000, the motor 400 is operated so as to produce a symmetrical movement, away from the axis Z-Z, of the two half-moulds 4*a*, 4*b*, causing them to open;

the entire mould holder unit 4 is positioned underneath the extruded plastic tubes 3 upon operation of the motor 300 (=outward stroke), the motor 400 is operated in the opposite direction to the previous direction so as to cause closing of the two half-moulds 4*a*, 4*b* around the tubes 3, the motor 300 is operated so that rotation of the gearing 211 on the rack 212 produces displacement, in the transverse direction Y-Y, of the entire moulding unit underneath the blowing station 5 where forming of the containers (return stroke) is performed;

the motor 400 is operated again in order to cause opening of the two half-moulds 4*a*,4*b*;

removal of the containers 3*a* is performed by discharging them with the aid of associated evacuation means 7; and a new cycle as per the sequence described above is started.

The movement sequences of the various parts, produced by the displacement motors 300, die raising/lowering motor 600 and mould opening/closing motor 400, are always performed in a cycle which comprises a first acceleration step during which the energy (current I) is drawn and a second deceleration and stoppage step during which energy is dissipated.

According to the invention it is envisaged that the control section 1000 of the machine is associated with a power supply/energy recovery apparatus which comprises a power supply/recovery base module 2000 able to rectify the alternating line voltage into direct voltage and at least one first control module 2300 for controlling the motor 300 performing transverse displacement of the mould holder unit; said base module 2000 is connected to the control module 2300 via a DC power supply line 2010 and via a control signal conveying line 2000*a*. The control module 2300 is in turn connected by means of a respective first line 2300*b* to the power supply of the motor 300 and by means of a second line 2300*c* to the transducer 300*c* (resolver/encoder) of the said motor.

Figure 4:
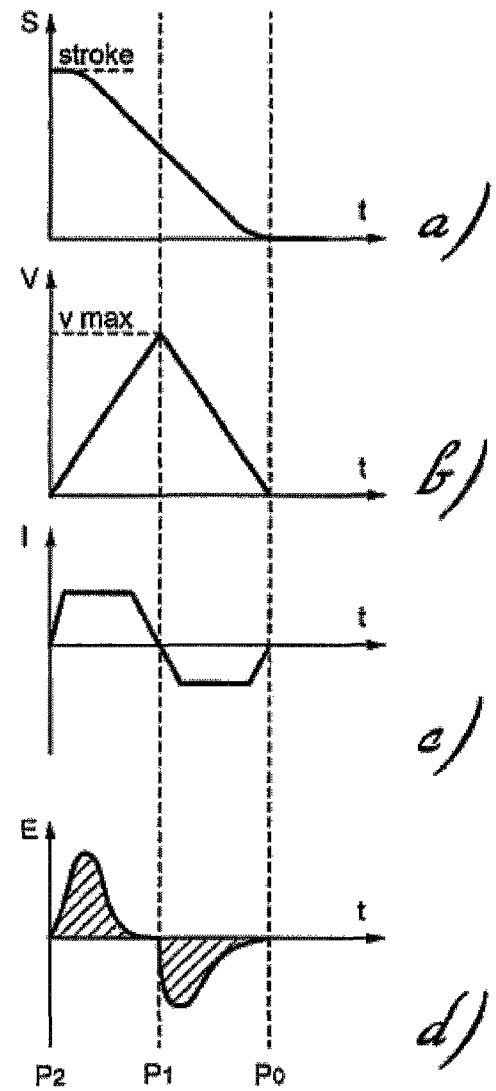
FIG. 4: shows graphs illustrating the trend of the control parameters of the electric motors during the return stroke.

As shown in FIGS. 3 and 4, respectively, during the two strokes, i.e. outward stroke P0-P1-P2 and return stroke P2-P1-P0, there is an acceleration of the unit 4 along the respective first section P0-P1 and P2-P1 of each stroke during which the following occur:

a high consumption of current I which increases rapidly along the first section of the stroke, since the unit must be moved;

a constant current consumption along a second section during which the unit reaches the displacement speed; and a lower current consumption along a third section where the unit starts to slow down as it nears the end of the stroke.

Along the stroke section P1-P2 and P1-P0, respectively, where the unit must stop at the end of the stroke P2/P0 there is generation of negative DC current (FIGS. 3*c*, 4*c*) which, instead of being dissipated as in the prior art, is sent to the control module 2300 of the power supply/recovery apparatus which, via the DC connection 2010, forwards said return current to the base module 2000 and provides a recovery voltage which may supply the other moving units or be introduced again into the network.

Advantageously the power supply/recovery apparatus comprises means for controlling and synchronizing the recovery/supply of energy, comprising a fast transmission channel 2000*d* which connects each electrical operating system 200, 300, 400, 500, 600 of the machine with a synchronization element 2000*e* located in the control unit 1000, allowing the latter to know in real time the actual acceleration/deceleration condition of the single motors and to deviate exactly at the same instant P1 the energy recovered from the motors during deceleration to the motors which are accelerating, avoiding energy loss due to the apparatus 2000 which always has an efficiency less than 1.

It is therefore clear how, owing to the energy recovery capacity of the machine according to the invention, it is possible to provide machines with high mould clamping forces—which machines are characterized in the prior art by a substantial increase in the weight of the various parts with a consequent substantial increase in the power consumption—but without producing a corresponding increase in the power consumption; this is possible in that the energy recovery which takes place during braking of the outward/return strokes is in any case proportional to the power consumed during acceleration of the said strokes, with the result that the energy consumption is substantially independent of the dimensions of the machine.

As shown in FIG. 5 it is also envisaged that the base module 2000 may be connected to other motors of the machine by expanding in a modular manner the apparatus by means of respective control modules 2200,2400,2500,2600 which are respectively connected to the associated motor 200,400,500, 600 by means of respective power supply cables 2200*b*; 2400*b*;2500*b*;2600*b* and control cables 2200*c*,2400*c*,2500*c*, 2600*c* which are connected to the respective transducer 200*c*, 400*c*, 500*c*, 600*c*, resulting during each slowing down and braking phase of the strokes in corresponding energy recovery which is added to the main recovery of the displacement operating motor.

By means of the synchronization devices, moreover, the overall efficiency of the machine is improved since the energy dissipation due to the power supply/recovery apparatus known in the art is avoided.

What is claimed is:

1. A Machine for forming containers (3a) comprising:
a unit (2) for extruding tubes (3) made of plastic, associated with an electric extrusion motor (200),
a blowing unit (5) associated with an electric blowing motor (500),
a mould (4) for containing the containers (3a), formed by two half-moulds (4a, 4b) movable, upon operation of an associated electric mould motor (400), in a longitudinal direction (X-X), the unit formed by the mould (4) and by the associated mould operating motor (400) being displaceable, upon operation of an electric displacement motor (300), in a transverse direction (Y-Y) from a first position substantially aligned with the extrusion unit (2) into a second position substantially aligned with the blowing unit (5) and vice versa, and
programming devices (1000) connected to the motors (200,300,400,500,600) wherein the programming devices (1000) are associated with a power supply/recovery apparatus comprising at least one base module (2000) and at least one first control module (2300) connected to said displacement motor (400) for controlling the acceleration/deceleration thereof during the displacement stroke and the recovery of energy during deceleration of each stroke and in that said machine programming devices (1000) comprise a synchronizer (2000e) connected to a fast transmission channel (2000d) arranged between the said synchronizer and the control module (2300) of the power supply and recovery apparatus.

2. The machine according to claim 1, wherein said base module (2000) is connected to the first control module (2300) via a DC power supply line (2010).

3. The machine according to claim 1, wherein said base module (2000) is connected to the first module (2300) via an associated control signal line (2000a).

4. The machine according to claim 1, wherein said control module (2300) is connected to the power supply of the displacement motor (300) via a respective first line (2300b).

5. The machine according to claim 1, wherein said control module (2300) is connected to the transducer (300c) of the motor via a respective second line (2300c).

6. The machine according to claim 1, wherein said power supply/energy recovery apparatus is expandable in a modular manner.

7. The machine according to claim 6, further comprising a second control module (2200) connected to the base module (2000) and to the nozzle motor (200), said control module being connected to the nozzle motor (200) via respective power supply cables (2200b) and to the transducer (200c) of the said motor via control cables (2200c).

8. The machine according to claim 6, further comprising a third control module (2400) connected to the base module (2000) and to the motor (400) for opening/closing the mould (4), said third control module being connected to the mould motor (400) via respective power supply cables (2400b) and to the transducer (400c) of the said motor via control cables (2400c).

9. The machine according to claim 6, further comprising a fourth control module (2500) connected to the base module (2000) and to the blowing motor (500), said fourth control module being connected to the blowing motor (500) via respective power supply cables (2500b) and to the transducer (500c) of the said motor via control cables (2500c).

10. The machine according to claim 6, further comprising a fifth control module (2600) connected to the base module (2000) and to the die motor (600), said fifth control module being connected to the die motor (600) via respective power supply cables (2600b) and to the transducer (600c) of the said motor via control cables (2600b).

11. The machine according to claim 10, wherein said programming devices (1000) are of the electromechanical, electronic and/or processing program type.

* * * * *